US011140595B2

(12) United States Patent
Jamieson

(10) Patent No.: US 11,140,595 B2
(45) Date of Patent: Oct. 5, 2021

(54) RAPID PICOCELL SWITCHING FOR WIRELESS TRANSIT NETWORKS

(71) Applicant: The Trustees of Princeton University, Princeton, NJ (US)

(72) Inventor: Kyle Jamieson, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 119 days.

(21) Appl. No.: 16/488,693

(22) PCT Filed: Mar. 2, 2018

(86) PCT No.: PCT/US2018/020610
§ 371 (c)(1),
(2) Date: Aug. 26, 2019

(87) PCT Pub. No.: WO2018/160937
PCT Pub. Date: Sep. 7, 2018

(65) Prior Publication Data
US 2021/0112470 A1    Apr. 15, 2021

Related U.S. Application Data

(60) Provisional application No. 62/466,479, filed on Mar. 3, 2017.

(51) Int. Cl.
*H04W 4/00*    (2018.01)
*H04W 36/08*    (2009.01)
(Continued)

(52) U.S. Cl.
CPC ........... *H04W 36/08* (2013.01); *H04W 36/04* (2013.01); *H04W 84/12* (2013.01)

(58) Field of Classification Search
CPC ...... H04W 36/08; H04W 36/04; H04W 84/12
See application file for complete search history.

(56) References Cited

U.S. PATENT DOCUMENTS

2008/0089287 A1\* 4/2008 Sagfors .......... H04W 36/00835
370/331
2009/0147697 A1 6/2009 Malik et al.
(Continued)

FOREIGN PATENT DOCUMENTS

WO    20180160937 A1    9/2018

OTHER PUBLICATIONS

International Preliminary Report on Patentability for International Application No. PCT/US2018/020610, entitled: "Rapid Picocell Switching for Wireless Transit Networks", Date of Issuance: Sep. 3, 2019.
(Continued)

*Primary Examiner* — Justin Y Lee
(74) *Attorney, Agent, or Firm* — Hamilton, Brook, Smith & Reynolds, P.C.

(57) ABSTRACT

Disclosed is a design and implementation of a Wi-Fi based network (e.g., roadside hotspot network designed to operate at vehicular speeds and picocell, meter-sized, cells). The disclosed access points (APs) make delivery decisions to the vehicular clients they serve at millisecond-level granularities, exploiting path diversity in roadside networks. In order to accomplish this, buffer management algorithms are employed that allow participating APs to manage each other's queues, rapidly quenching each other's transmissions and flushing each other's queues. An example embodiment of the disclosed approach employs an eight-AP network alongside a nearby road, and was evaluated with mobile clients moving at up to 25 mph. Depending on mobility speed, the disclosed approach achieves a 2.4-4.7 times TCP throughput improvement over a baseline fast handover protocol that captures the state of the art in Wi-Fi roaming, the IEEE 802.11k and 802.11r standards.

24 Claims, 10 Drawing Sheets

(51) Int. Cl.
*H04W 36/04* (2009.01)
*H04W 84/12* (2009.01)

(56) References Cited

U.S. PATENT DOCUMENTS

| | | |
|---|---|---|
| 2010/0260103 A1 | 10/2010 | Guey et al. |
| 2012/0300746 A1 | 11/2012 | Ibrahim et al. |
| 2014/0086132 A1 | 3/2014 | Liu et al. |
| 2019/0327651 A1* | 10/2019 | Yiu .................. H04W 36/0094 |

OTHER PUBLICATIONS

Zhenyu, et al: "Wi-Fi Goes to Town", Proceedings of the Conference of the ACM Special Interest Group on Data Communication, SIGCOMM '17, ACM Press, New York, New York, USA, sESSION 8, Aug. 2017 (Aug. 7, 2017), pp. 322-334.
International Search Report and Written Opinion of the International Searching Authority for International Application No. PCT/US2018/020610, entitled: "Rapid Picocell Switching for Wireless Transit Networks", dated Oct. 7, 2018.
Yunze Zeng, et al. "MAPS: MU-MIMO-Aware AP Selection for 802.11ac Networks", 2017, 14 pages.

* cited by examiner

RAPID PICOCELL SWITCHING FOR WIRELESS TRANSIT NETWORKS

RELATED APPLICATION

This application is the U.S. National Stage of International Application No. PCT/US2018/020610, filed Mar. 2, 2018, which designates the U.S., published in English, and claims the benefit of U.S. Provisional Application No. 62/466,479, filed on Mar. 3, 2017. The entire teachings of the above applications are incorporated herein by reference.

GOVERNMENT SUPPORT

This invention was made with government support under Grant No. CNS-1617161 awarded by the National Science Foundation. The government has certain rights in the invention.

BACKGROUND

Every day, billions of commuters journey in and out of the world's urban centers, many by train, light rail, or underground transport, and others in vehicles that may soon become driverless in the coming decade. Today this commute is often wasted time, but looking forward, there may be great demand for high-capacity wireless networks serving transportation corridors, allowing users to surf the web, complete video and audio calls or teleconferences, and stream video and music entertainment, all on the commute.

Compared with capacity gains from new technologies, it has been estimated that the majority of capacity gains over the past 45 years can be attributed to decreasing the size of each cell, the geographic area each access point (AP) covers. However, moving to smaller cells immediately creates a tension between the two goals of capacity and range, exacerbating the range problem. This necessitates a handover, where a number of APs cooperate to serve a client as it moves from one cell to the next (one AP to the next).

Roaming between Wi-Fi APs has been standardized, with the recent 802.11r standard enabling a client device to make a connection with another AP before abandoning the current AP. Other parts of the Wi-Fi standard, namely 802.11k, allow the current AP to inform the client about other nearby APs and channels, so that when the time comes for the client device to abandon the current AP, it may immediately begin the association process with those APs, rather than discovering their existence from scratch. But these solutions are too slow for the scenarios considered herein, necessitating larger cells and thus clawing back the capacity gains of smaller cells.

SUMMARY

The systems and methods disclosed herein can take advantage of recent developments in access points, which have demonstrated that commodity Wi-Fi APs can extract detailed channel measurements and track mobile client devices to decimeter-level accuracy, thus helping to predict, to a high degree of certainty, the AP or APs best suited to serve a client device as it moves. In addition, very low cost Wi-Fi chipsets are arriving on the market, making for cost-feasible very-high-density Wi-Fi AP installations.

One example embodiment is a system for controlling communication of wireless access points with a client device. The example system includes a plurality of wireless access points configured to communicate with the client device, and a controller in communication with the wireless access points. The wireless access points are configured to determine communication channel properties of the wireless communication channels between each of the wireless access points and the client device based on communication with the client device over the wireless channels. Each wireless access point includes a queue of data to send to the client device. The controller is configured to select, from among the plurality of wireless access points based on the communication channel properties, a wireless access point to send data to the client device. The controller is further configured to, when switching from a first wireless access point to a second wireless access point, cause the second wireless access point to be provided with information regarding a position in its queue at which to start sending data to the client device.

Another example embodiment is a method of controlling communication of a plurality of wireless access points with a client device. Each wireless access point includes a queue of data to send to the client device. The example method includes, by the plurality of wireless access points, determining communication channel properties of the wireless communication channels between the wireless access points and the client device based on communication with the client device over the wireless channels, and forwarding the communication channel properties to a controller. The method further includes, by the controller, determining based on the communication channel properties a wireless access point from among the plurality of wireless access points to send data to the client device and, when switching from a first wireless access point to a second wireless access point, causing the second wireless access point to be provided with information regarding a position in its queue at which to start sending data to the client device. In the example system and method, the communication channel properties can include, for example, Channel State Information (CSI) as defined in IEEE 802.11.

Each wireless access point can be configured to measure communication channel properties for communications between the wireless access point and the client device, and transmit the communication channel properties to the controller. In such embodiments, communication between the wireless access points and the client device can be sent via Transmission Control Protocol, and the communication channel properties can be sent from the wireless access points to the controller via User Datagram Protocol. The controller can receive the communication channel properties by the wireless access points and determine signal-to-noise ratios for corresponding wireless communication channels based on the communication channel properties, and can select a wireless access point with the greatest signal-to-noise ratio.

The controller can provide to wireless access points in a vicinity of the client device a downlink packet destined for the client device. In such embodiments, the controller can remove, from the queue of each wireless access point not selected to send data to the client device, data that has been sent to the client device by the wireless access point selected to send data to the client device. In some embodiments, the controller can remove, from a 802.11 link-layer queue and associated block acknowledgement scoreboard data structure of each wireless access point not selected to send data to the client device, data that has been sent to the client device by the wireless access point selected to send data to the client device, and the associated block acknowledgement scoreboard state.

Another example embodiment is a system for communication between wireless access points and a client device. The example system includes a plurality of wireless access points configured to communicate with the client device, and a controller in communication with the wireless access points. The wireless access points are configured to receive acknowledgement data from the client device in response to data sent to the client device. The controller is configured to select, from among the plurality of wireless access points, a wireless access point to send data to the client device. In an event (i) the controller causes a first wireless access point to stop sending data to the client device and a second wireless access point to send data to the client device, (ii) the first wireless access point does not receive acknowledgement data from the client device for certain data sent to the client device by the first wireless access point, and (iii) the second wireless access point receives the acknowledgement data from the client device for the certain data, the second wireless access point or the controller provides the acknowledgement data to the first wireless access point.

Another example embodiment is a method of communicating between a plurality of wireless access points and a client device. The example method includes, by a controller, determining a second wireless access point from among the plurality of wireless access points to send data to the client device, causing a first wireless access point to stop sending data to the client device, and causing the second wireless access point to send data to the client device. The method further includes in an event (i) the first wireless access point does not receive acknowledgement data from the client device for certain data sent to the client device by the first wireless access point, and (ii) the second wireless access point receives the acknowledgement data from the client device for the certain data, providing, by the second wireless access point or the controller, the acknowledgement data to the first wireless access point.

In the example system and method, the acknowledgement data can includes Transmission Control Protocol acknowledgement data or IEEE 802.11 link-layer block acknowledgement data.

Wireless access points not selected to send data to the client device can monitor for acknowledgement data sent from the client device to the wireless access point selected to send data to the client device. In such embodiments, the monitoring wireless access points can send received acknowledgement data to the wireless access point selected to send data to the client device. The wireless access point selected to send data to the client device can update an acknowledgement data structure with the acknowledgement data received from a monitoring wireless access point if the acknowledgement data was not already received.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Disclosed are Wi-Fi based systems and methods of operation designed to operate in new performance regimes for wireless networks. Such a regime is the vehicular picocell regime. The disclosed systems and methods use a controller commanding control of an access point (AP) array. The disclosed controller and APs cooperate to implement selection of an AP, downlink queue management, and uplink acknowledgement sharing that can work hand-in-hand to leverage wireless path diversity to precisely switch downlink traffic and make uplink acknowledgements more reliable.

Figure 1:
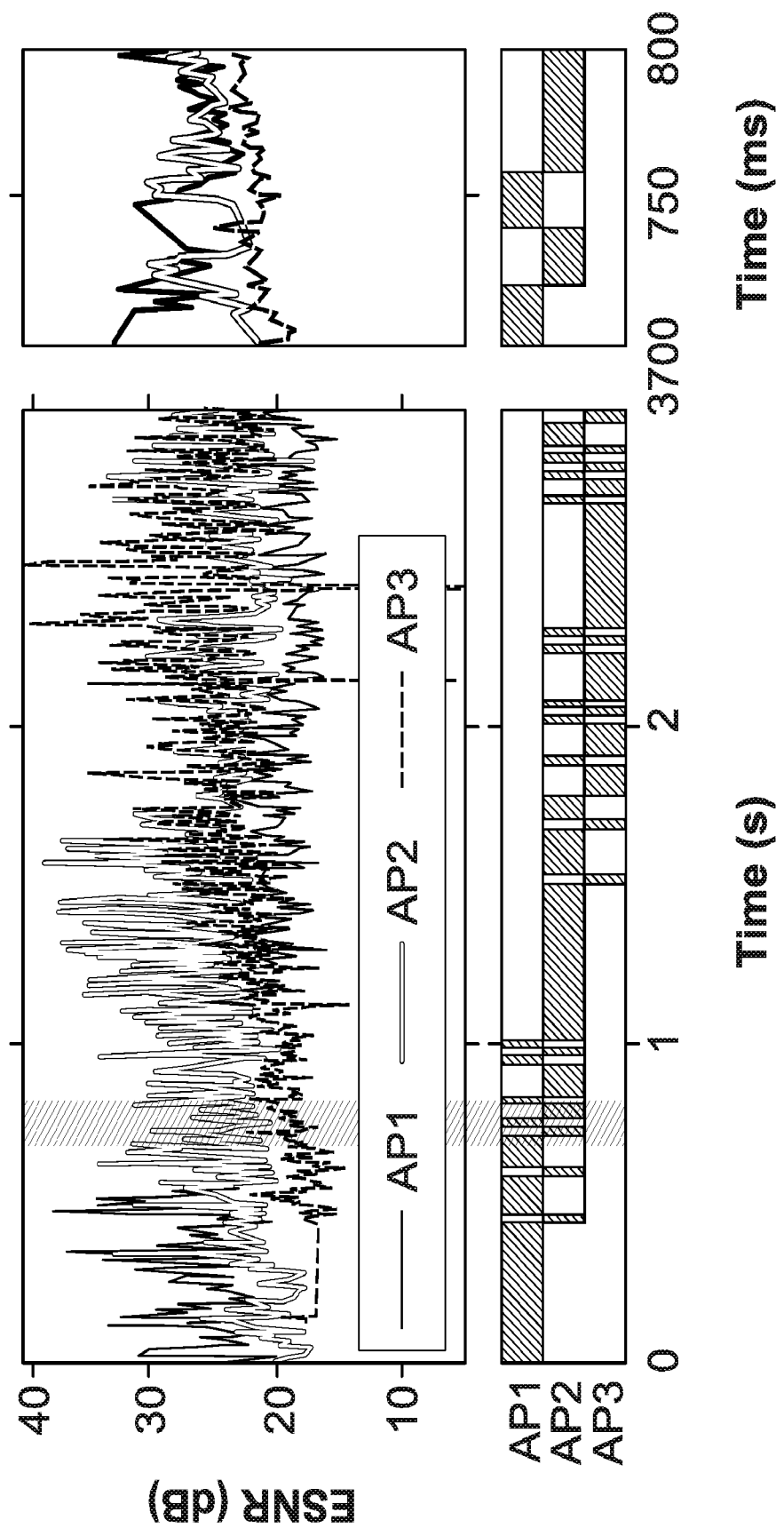
FIG. 1 is a graph illustrating constructive and destructive wireless multipath fading as measured by Effective SNR (upper plots) conspiring with vehicular speed mobility to change the AP best able to deliver packets to a mobile client (lower plots) at millisecond timescales (right detail view).

The disclosed systems and methods present an opportunity to transform the design of a network (e.g., roadside and metropolitan transit wireless network) with a widespread deployment of an array of relatively inexpensive Wi-Fi "picocell" APs, each covering just a few meters, for example, of a busy urban transit corridor. Such a design faces a fundamental challenge illustrated in FIG. 1: the wireless capacity (achievable throughput) to each AP exhibits two wireless trends as a mobile user drives past the Wi-Fi picocell array. First, there is fading at second-level scales due to distance, but second, there is rapid, millisecond-level fast fading due to alternating constructive and destructive multipath propagation, on the spatial scale of an RF wavelength (e.g., 12 cm at 2.4 GHz). Furthermore, due to the dense deployment of APs in the array (to attain good coverage), the large-scale and small-scale fades overlap in time to make the best choice of AP (shown at the bottom of the figure) change every millisecond. The combination of AP diversity, vehicular client mobility, and meter-level AP cell size may be referred to as a vehicular picocell regime.

As users travel at high speed through an underground tunnel or along a road, for example, a controller can switch downlink traffic (traffic to mobile users) to nearby APs in the array, one of which will be best able to deliver the packet to where the user's device will be tens of milliseconds later.

Then, at the precise nor approximate millisecond that a client is in the coverage area of one or more of the APs, the APs can cooperate directly to schedule one of the APs to make a packet delivery attempt to the client, which if successful, can cue the other APs to dequeue the delivered packet. For traffic on the uplink from the mobile to the AP array, any AP can receive each such frame, but before forwarding the frame out of the network, the system can de-duplicate each frame in the event that more than one AP receives the same frame.

Figure 2:
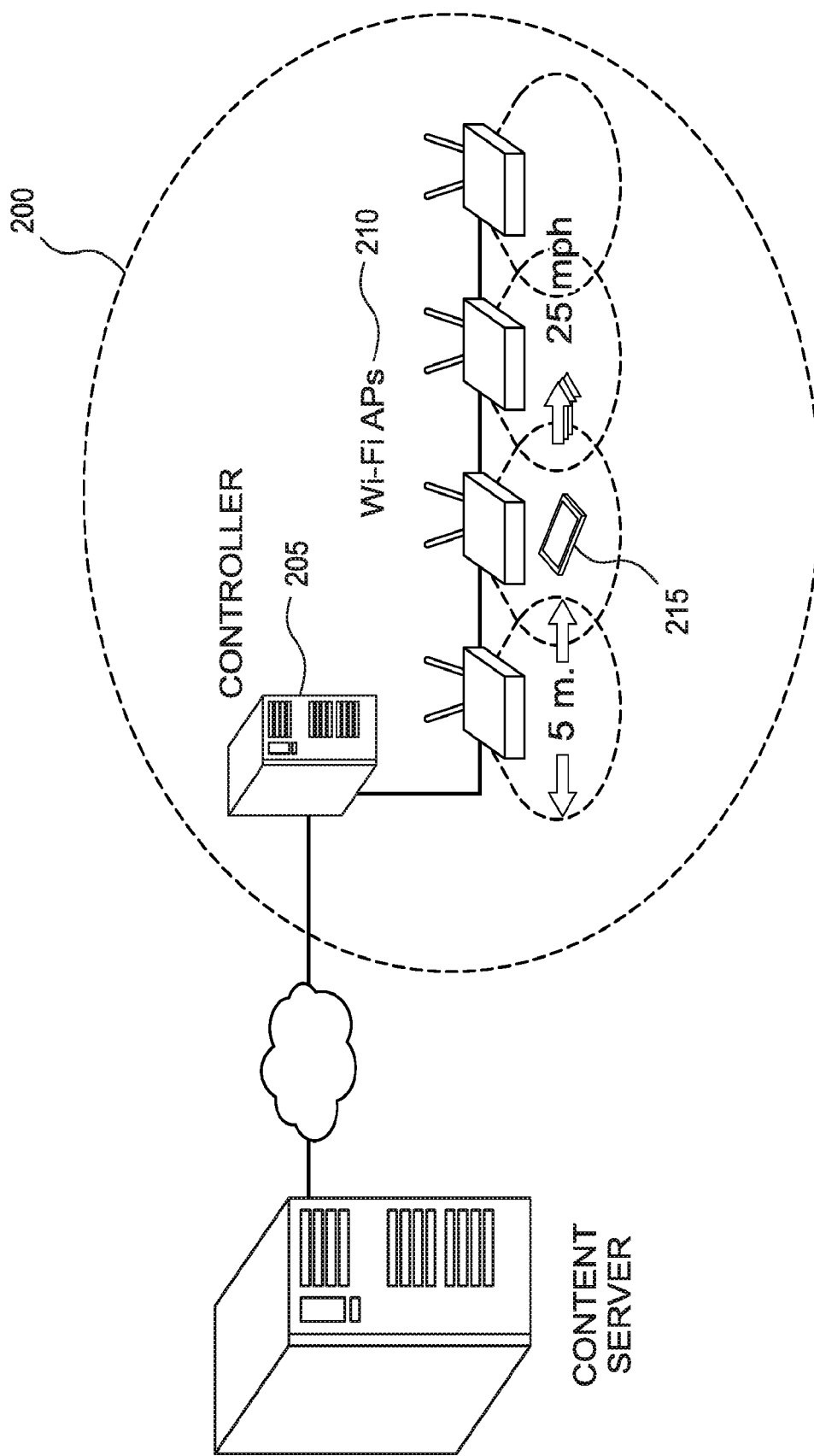
FIG. 2 is a schematic diagram illustrating a system for controlling communication of wireless access points with a client device, according to an example embodiment.

FIG. 2 is a schematic diagram illustrating an example system 200 that can operate efficiently in the vehicular picocell regime via a nearby controller 205 commanding tight control of an AP array 210. The example system includes a plurality of wireless access points 210 configured to communicate with a client device 215, and a controller 205 in communication with the wireless access points 210. The wireless access points 210 are configured to determine communication channel properties of the wireless communication channels between each of the wireless access points 210 and the client device 215 based on communication with the client device 215 over the wireless channels. Each wireless access point 210 includes a queue of data to send to the client device 215. The controller 205 is configured to select, from among the plurality of wireless access points 210 based on the communication channel properties, a wireless access point 210 to send data to the client device 215. The controller 205 is further configured to, when switching from a first wireless access point to a second wireless access point, cause the second wireless access point to be provided with information regarding a position in its queue at which to start sending data to the client device 215.

Figure 3:
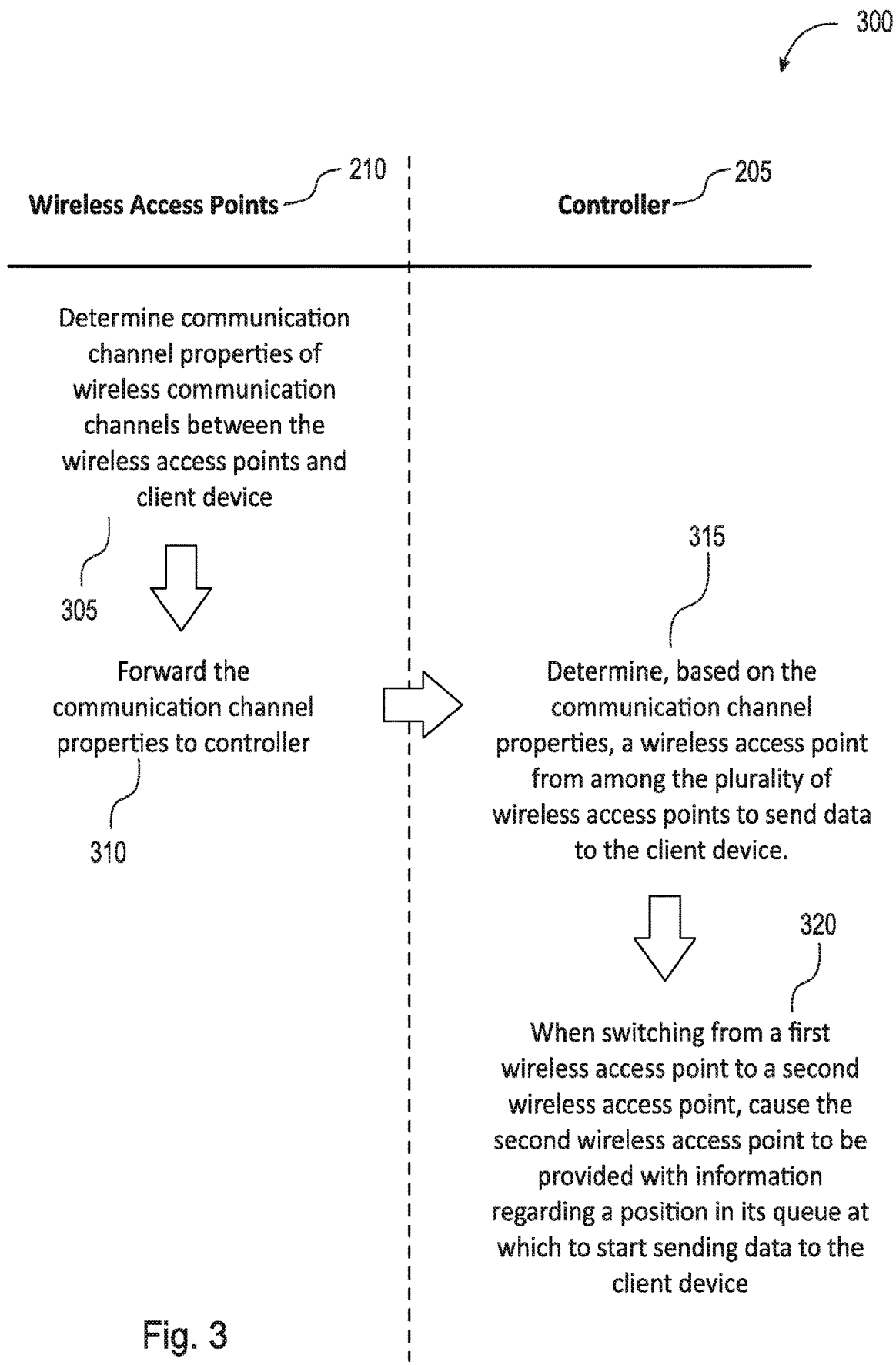
FIG. 3 is a flow diagram illustrating a method of controlling communication of wireless access points with a client device, according to an example embodiment.

FIG. 3 is a flow diagram illustrating an example method 300 of controlling communication of wireless access points 210 with a client device 215. Each wireless access point 210 includes a queue of data to send to the client device 215. The example method 300 includes, by the plurality of wireless access points 210, determining 305 communication channel properties of the wireless communication channels between the wireless access points and the client device based on communication with the client device over the wireless channels, and forwarding 310 the communication channel properties to a controller 205. The method 300 further includes, by the controller 205, determining 315 based on the communication channel properties a wireless access point from among the plurality of wireless access points 210 to send data to the client device 215, and, when switching from a first wireless access point to a second wireless access point, causing 320 the second wireless access point to be provided with information regarding a position in its queue at which to start sending data to the client device 215.

The challenge involved in realizing actual wireless performance gains in this setting stems from packet queueing, which occurs in many network layers and software and hardware components in Wi-Fi networks. A modest amount of queuing (e.g., 20 milliseconds or 100 packets) in the operating system driver or the Wi-Fi hardware itself allows modern 802.11 wireless link layers to combine queued packets into larger aggregate packets. This aggregation is important to maintaining a high ratio of fixed per-frame overhead (necessary to coordinate access to the wireless medium) to useful data airtime as wireless data bit-rates increase. Buffering at higher layers, such as the operating system's transport-layer socket, allows applications to exploit asynchronous I/O. However, while helpful in these regards, buffering at an individual AP results in the transmission of a backlog of packets once the controller 205 has made a decision to switch away from that AP. Buffering thus adds a significant latency to the controller's switching decision, a delay that is insignificant in current AP handover systems and systems based on Multipath TCP, but highly significant for the vehicular picocell regime. To address the problem of controller-AP switching latency, the disclosed systems and methods maintain current amounts of buffering at APs 210, but introduce hooks for the controller 205 to dequeue pending packets buffered at APs 210 once the controller 205 makes a switching decision.

Since the wireless channel is unpredictable in the vehicular picocell regime, with a coherence time—the period of time over which the wireless channel remains stable—of about two-three ms at 2.4 GHz, the system can rely on lightweight channel state information (CSI) readings from a client's uplink transmissions, from which it can compute Effective SNR (ESNR) and quickly decide which AP 210 should deliver the next few packets to the mobile client device 215. The system can be implemented on, for example, commodity TP-Link APs, with a single Linux controller running the Click modular router. Each roadside AP 210 can be equipped with a parabolic antenna of beamwidth 21 degrees. An Atheros CSI Tool can be installed on each AP, which can measure the CSI of each incoming frame and forward it to the controller 205 for processing.

The system can be deployed using, for example, eight APs on an upper floor of an office building overlooking a road with a speed limit of 25 mph. APs can communicate with the controller via Ethernet backhaul. Experiments comparing the disclosed systems and methods with a performance-tuned version of the IEEE 802.11r and 802.11k fast handover protocol (capturing the current state of the art in Wi-Fi handover techniques) show a 2.4-4.7 times improvement in TCP download performance and a 2.6-4.0 times improvement in UDP download performance as vehicular speed ranges from five to 25 mph, and 2.4-2.6 times improvement in TCP and UDP download performance in a multi-client scenario.

Wi-Fi Roaming at Driving Speed

Commercial Wi-Fi APs supporting the 802.11r standard speed handovers a client from one AP to the next by allowing the client to establish authentication with a new AP prior to de-associating with the current AP. But 802.11r is tuned for walking speed mobility with large cells. To understand the prior method's performance in the vehicular picocell regime, an evaluation was made using a 802.11r-based APs in an outdoor roadside testbed. The distance between two APs in the evaluation was 7.5 m, and the cell size of each AP was 5.2 m. Constant-rate stream of UDP packets was sent using iperf3 to a mobile device client in a car driving by, first at five mph, and then at 20 mph.

In the 20 mph test, a re-association packet sent from the client to $AP_1$ was identified at around 4.6 s, indicating that the client tried to switch to $AP_2$. However, no acknowledgements (acks) were identified at the client side even though the client retransmits the re-association packet multiple times, and so the handover failed. As the client moved further away from $AP_1$, link quality deteriorated significantly, with the client receiving the last packet from $AP_1$ at approximately 4.8 s. The handover fails because 802.11r does not make its switching decision until it collects a long (5 s) history of RSSI measurements, longer than the client spends within hearing range of $AP_1$ at 20 mph. As a result, by the time the client has determined it should switch, the link condition of the current AP has already deteriorated. Even in the 5 mph case, handover happens significantly later than it should, resulting in the AP needing to decrease its bitrate, sacrificing wireless capacity.

Example System Design

Figure 4:
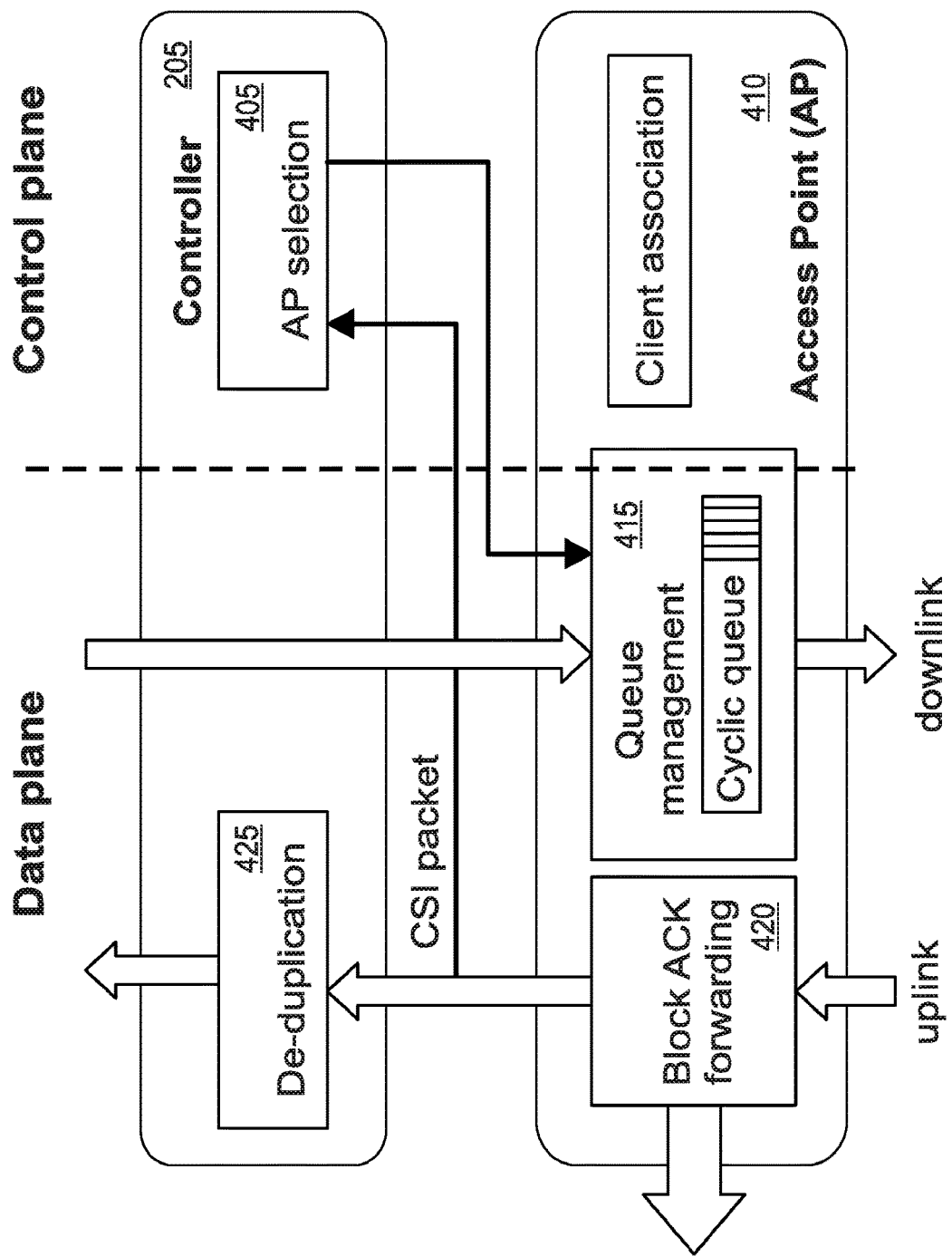
FIG. 4 is a block diagram illustrating a high-level design of a system for controlling communication of wireless access points with a client device, according to an example embodiment.

FIG. 4 illustrates an example high-level design of an example system. A controller 205 and an AP 410 (one of the plurality of APs 210) is shown. The AP selection 405 and downlink queue management 415 can work hand-in-hand to leverage wireless path diversity at millisecond-level timescales to speed the delivery of downlink traffic as the client transitions moves through the grey zones of multiple APs 210 simultaneously. The block acknowledgement forwarding 420 and packet de-duplication 425 mechanisms can work together with downlink data delivery to the same path diversity at the same fine-grained timescales to make 802.11's frame aggregation block acknowledgements more reliable, also increasing throughput.

Downlink Packet Flow—For every downlink packet to a certain client, the system can choose the AP best able to deliver the packet to the client, and manage packet queues at all APs to ensure the selected AP delivers the selected packet to the client milliseconds later.

AP Selection 405—To operate in the vehicular picocell regime, the AP selection should be accurate in its packet delivery rate predictions and agile enough to react in milliseconds. To achieve these goals, link quality can be measured with an Effective SNR (ESNR) metric, computed at each AP from channel state information (CSI), for example, extracted from a client's uplink transmission. Each AP can measure CSI on all 56 OFDM subcarriers, encapsulating these readings into a UDP packet, and delivering the packet to the controller 205 over an Ethernet backhaul. Upon receiving the packet, the controller 205 can extract the communication channel properties (e.g., CSI information) and compute ESNR. ESNR takes SNR variations across subcarriers into account, hence more accurately predicts packet delivery probability in the presence of a highly frequency-selective channel (i.e., when multipath reflections are strong).

Figure 5:
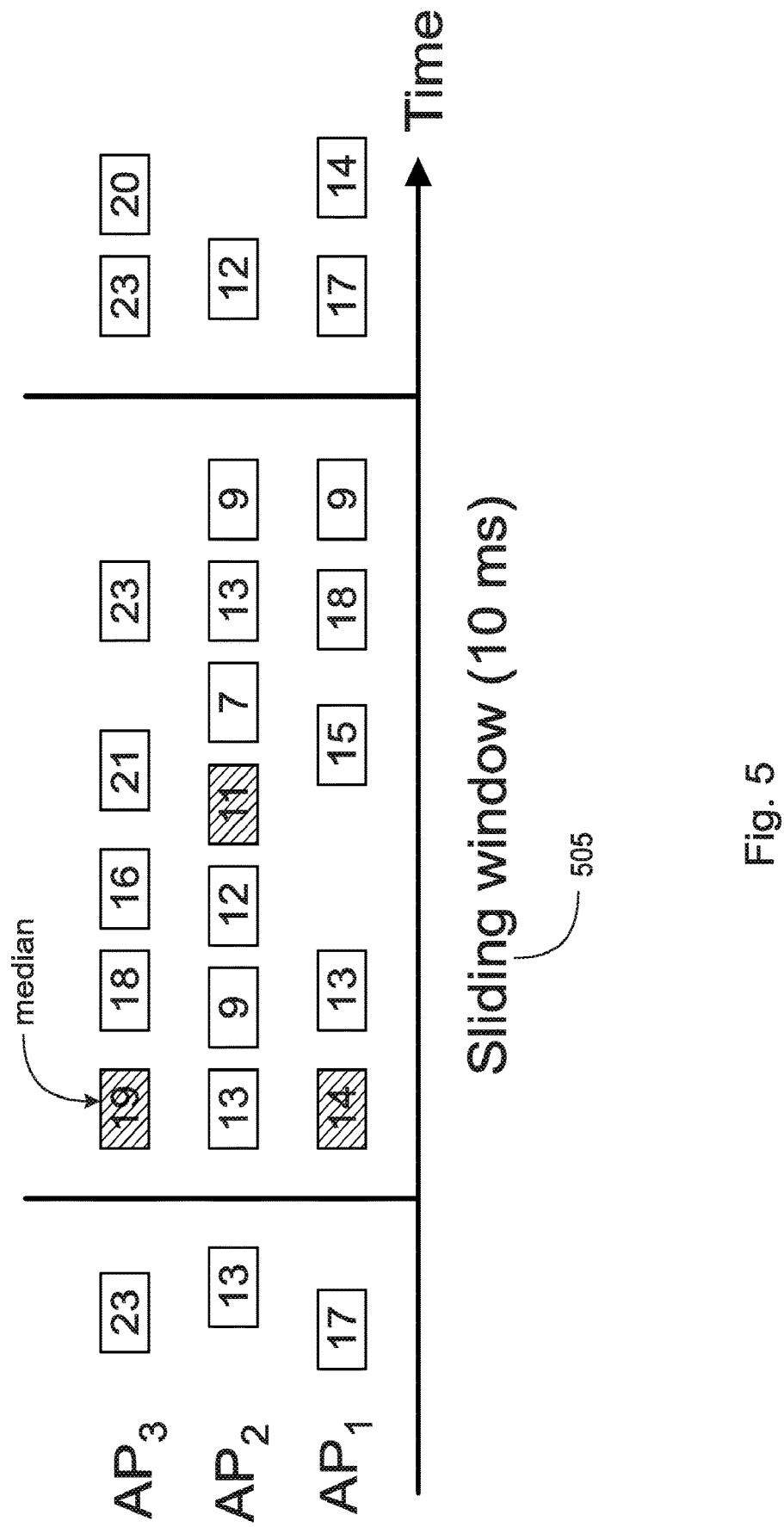
FIG. 5 is a schematic diagram illustrating selection of a wireless access point with the greatest median Signal-to-Noise Ratio (SNR), according to an example embodiment.

FIG. 5 illustrates selection of a wireless access point with the greatest median Signal-to-Noise (SNR). The disclosed systems and methods can measure the short-term history of ESNR readings from packets received over each client-AP link in a sliding window 505 of duration W. For a certain client and AP a, denote the (sorted, monotonically non-decreasing) sequence of $L_a$ ESNR readings in the window by $E(a)=[e_1(a), \ldots e_{La}(a)]$.

After sorting, select the AP a* with the maximal median ESNR reading in the E(a) window:

$$a^* = \underset{a}{\operatorname{argmax}} \left\{ e_{\lfloor \frac{L_a}{2} \rfloor}(a) \right\}$$

Figure 6:
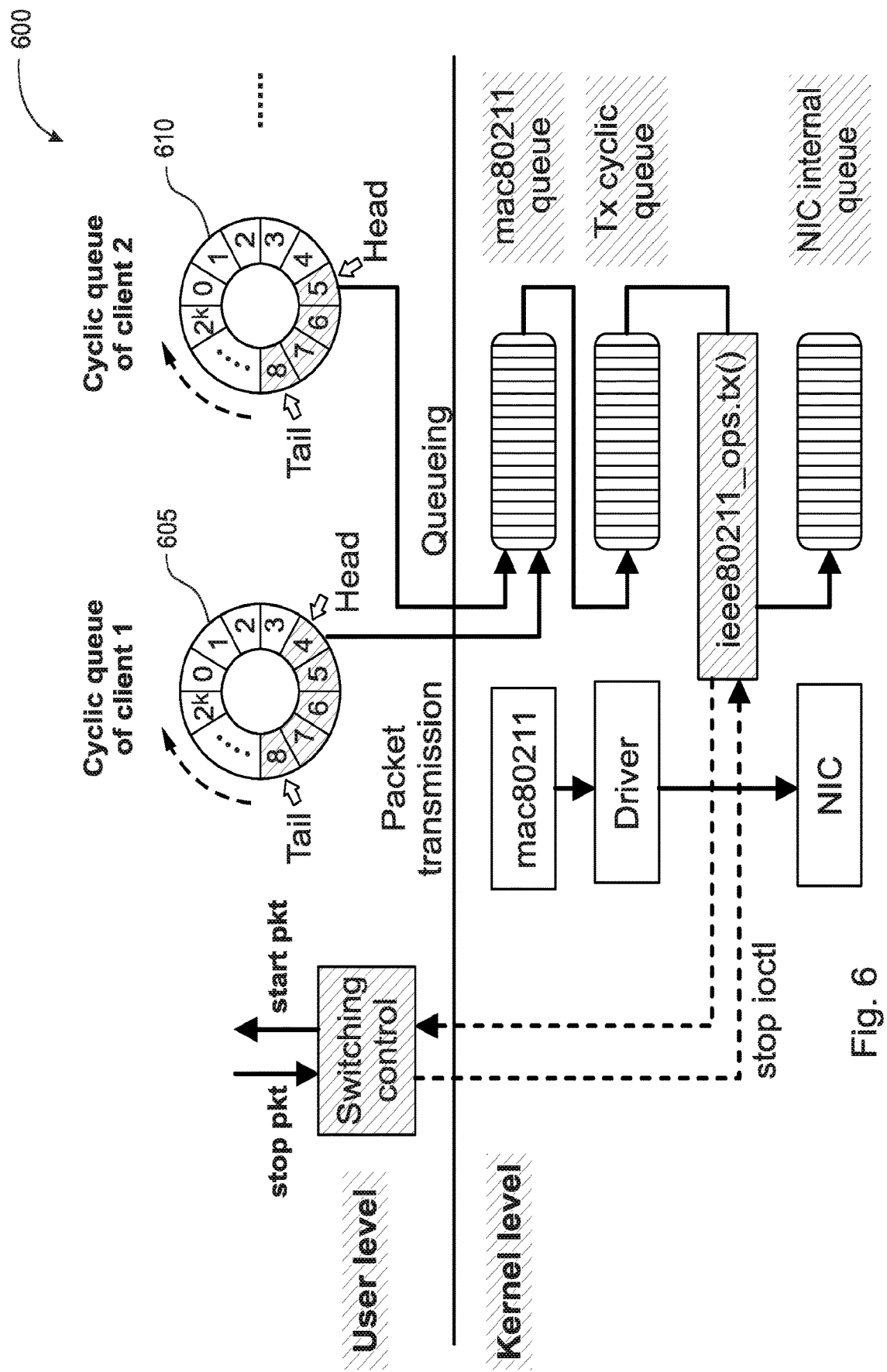
FIG. 6 is a block diagram illustrating packet queueing, according to an example embodiment.

AP Queue Management 415—To rapidly switch between APs 210, the controller 205 can forward each downlink packet to all APs within communication range of the client 215 (e.g., the APs that have received a packet from the client 215 within the AP selection window W 505), while allowing just one AP at a time (as determined by the AP selection 405) to transmit packets to the client 215. Each other AP buffers downlink packets in a cyclic queue, such as the example cyclic queues 605 and 610 shown in FIG. 6, which can also summarize all other locations in the AP where packets are buffered. FIG. 6 illustrates cyclic queues 605 and 610 of an example AP 600. Each cyclic queue 605 and 610 include packets destined for a certain client. Both packet switching and queue management can use an index number to identify each data packet. An m-bit index number can be used for each data packet, which increments by one for each packet destined to a certain client. m can be set to 12 to guarantee the uniqueness of each index number in each client's cyclic buffer.

When the controller 205 switches from one AP to the next (e.g., $AP_1$ to $AP_2$), there may be roughly 1,600 (at 50 Mbit/s UDP offered load) to 2,000 packets (at 90 Mbit/s UDP offered load) backlogged in $AP_1$'s queues, at various layers of the networking stack as shown in FIG. 6. Unless dequeued, $AP_1$ will attempt to deliver these backlogged packets to the client 215, likely failing, thus sacrificing channel capacity and disrupting any ongoing TCP flows to that client 215.

Switching Protocol—When the controller 205 determines that the client 215 should be switched from $AP_1$ to $AP_2$, it instructs $AP_1$ to tell $AP_2$ which packets are backlogged in its queues. Since these backlogged packets are already buffered in $AP_2$'s cyclic queues even before the switch, $AP_2$ can then deliver them to the client 215 almost immediately. The switching protocol can include the following steps: (1) The controller 205 sends a stop(c) control packet to $AP_1$, instructing it to cease sending to a client c. The stop packet may contain the layer-2 addresses of c and $AP_2$. (2) After receiving stop(c), AP' ceases sending to client c, and sends to $AP_2$ a start control packet containing c and the index k of the first unsent packet destined to client c: start(c, k). (3) After receiving start(c, k), $AP_2$ sends an acknowledgement (ack) control packet back to the controller 205, and begins transmitting packets from its cyclic queue at index k to client c. After the switch, $AP_2$ can continue delivering new downlink packets received from the controller to c. In the absence of control packet loss, the switch is accomplished after these steps. However, both the control packet and the ack packet may be lost, and so a timeout can be set for the control packet retransmission. For example, if the controller 205 does not receive the ack within 30 ms, it can retransmit the stop packet. On the other hand, since the control and ack packets manage the downlink packet switching, these packets should be processed promptly for switching delay minimization. In the AP, incoming control packets can be are prioritized, bypassing the cyclic queue. Control packets can thus be given higher priority, so that they are always processed ahead of data packets and thereby minimizing switching delay.

Running the switching protocol takes over 17 ms on average (as shown in Table 1 below). During the time that the switch is happening, $AP_1$ can be allowed to send the backlogged packets buffered in its hardware NIC queue. These packets take about 6 ms to deliver, thus while they are sent over $AP_1$'s inferior link, the capacity loss is minimal.

TABLE 1

Measuring the running time of the switching protocol in different data rate settings.

| Data rate (Mb/s) | 50 | 60 | 70 | 80 | 90 |
|---|---|---|---|---|---|
| Mean execution time (ms) | 17 | 19 | 21 | 19 | 17 |
| Standard deviation (ms) | 3 | 5 | 4 | 5 | 3 |

Implementing a Switch—The ieee80211 ops tx( ) function can be modified in the Linux kernel to keep track of the index of the last packet destined to each client just before it enters the NIC's hardware queue. When $AP_1$ receives a stop(c) packet from the controller 205, it can query the index number for c in the kernel through an ioctl system call: this is the first unsent packet destined to c (index number k). The ieee80211 ops tx( ) function replies and then monitors the backlogged packets that flow out of the driver's transmit cyclic queue and filters out packets destined to client c. Upon receiving the packet index from the kernel, $AP_1$ sends start(c, k) to $AP_2$.

Packet Addressing and Tunneling—In the controller 205, both the layer-2 and layer-3 headers of the downlink packet have the destination set to the addresses of the clients. They cannot be changed to the AP's address, otherwise the AP cannot decide which client the packet should be delivered to, so the downlink packets can be tunnel in an IP packet with the AP's IP address in the destination field.

Uplink Packet Flow—On the uplink, the disclosed systems and methods can use a new technique, block acknowledgement forwarding, which can be integrated with frame aggregation to make block acknowledgements more reliable, reducing retransmissions on the downlink.

Figure 7:
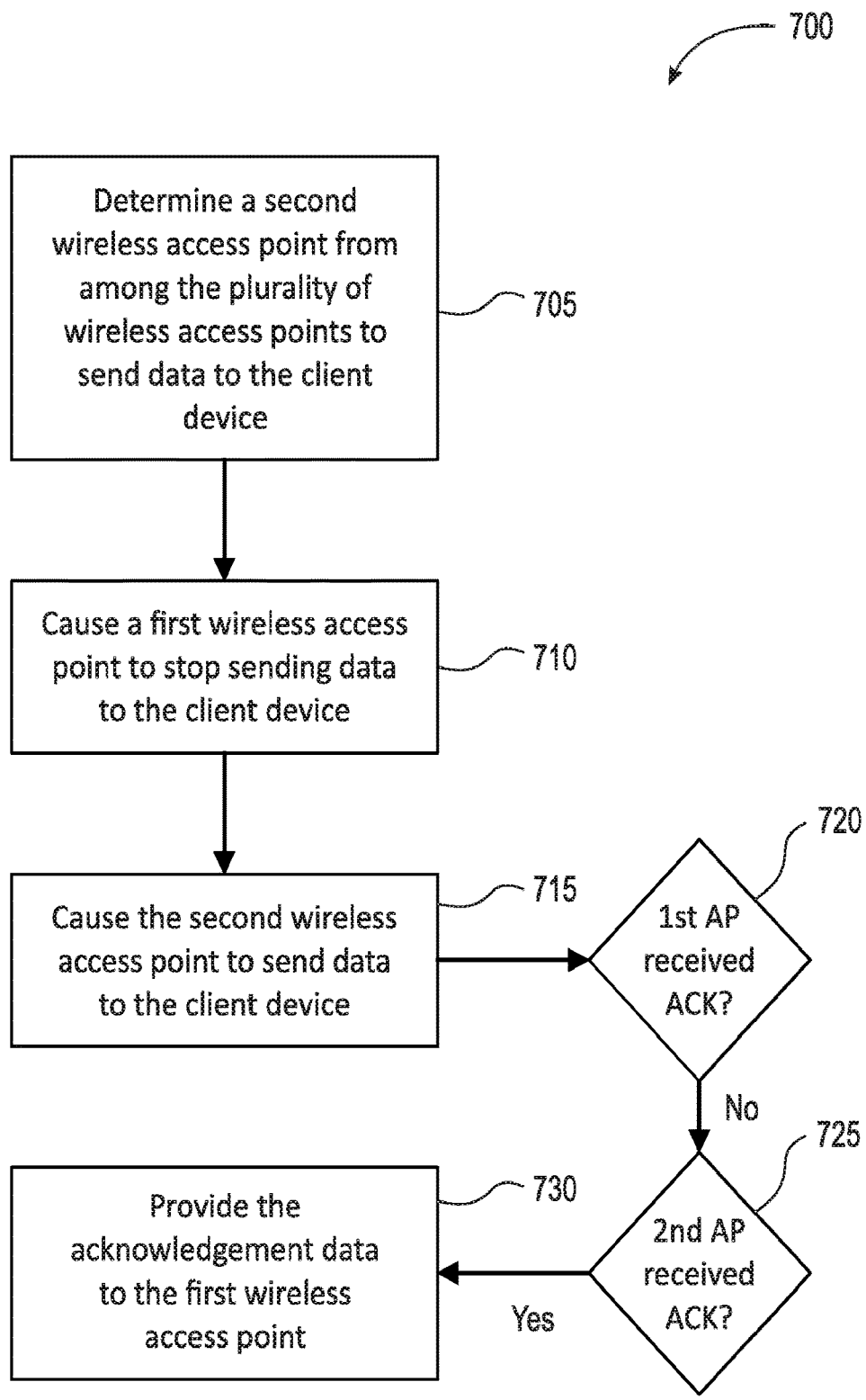
FIG. 7 is a flow diagram illustrating a method of communicating between a plurality of wireless access points and a client device, according to an example embodiment.

FIG. 7 is a flow diagram illustrating an example method 700 of communicating between a plurality of wireless access points 210 and a client device 215. The example method includes, by a controller 205, determining 705 a second wireless access point from among the plurality of wireless access points 210 to send data to the client device 215, causing 710 a first wireless access point to stop sending data to the client device 215, and causing 715 the second wireless access point to send data to the client device 215. The method 700 further includes in an event (i) the first wireless access point does not receive 720 acknowledgement data from the client device for certain data sent to the client device by the first wireless access point, and (ii) the second wireless access point receives 725 the acknowledgement data from the client device for the certain data, providing 730, by the second wireless access point or the controller 205, the acknowledgement data to the first wireless access point.

Block Acknowledgement Forwarding 420—The Wi-Fi block acknowledgement mechanism (first introduced in the 802.11e standard) improves channel efficiency by aggregating multiple packet acknowledgements into one frame. The block acknowledgement (Block ACK) can include a bitmap to selectively acknowledge individual frames in a window of packets. When the client 215 moves at vehicular speed, its Block ACK is prone to loss due to the constructive and destructive wireless multipath fading, especially near the edges of an individual AP's coverage. In this case, the AP, according to the 802.11e standard, retransmits all packets that should be acknowledged in the lost Block ACK, hurting throughput and channel utilization.

The disclosed systems and methods can exploit path diversity, designing a link-layer protocol to allow APs not currently communicating with the client device 215 to forward an overheard Block ACK to the client's current AP over the Ethernet backhaul. As an example, two virtual NIC interfaces can be created for each AP, with one working in AP mode to handle normal uplink/downlink packet flows, and another working in monitor mode to overhear packets and captures block ACKs. The monitor mode interface can be disabled in the AP that the client currently communicating with.

Figure 8:
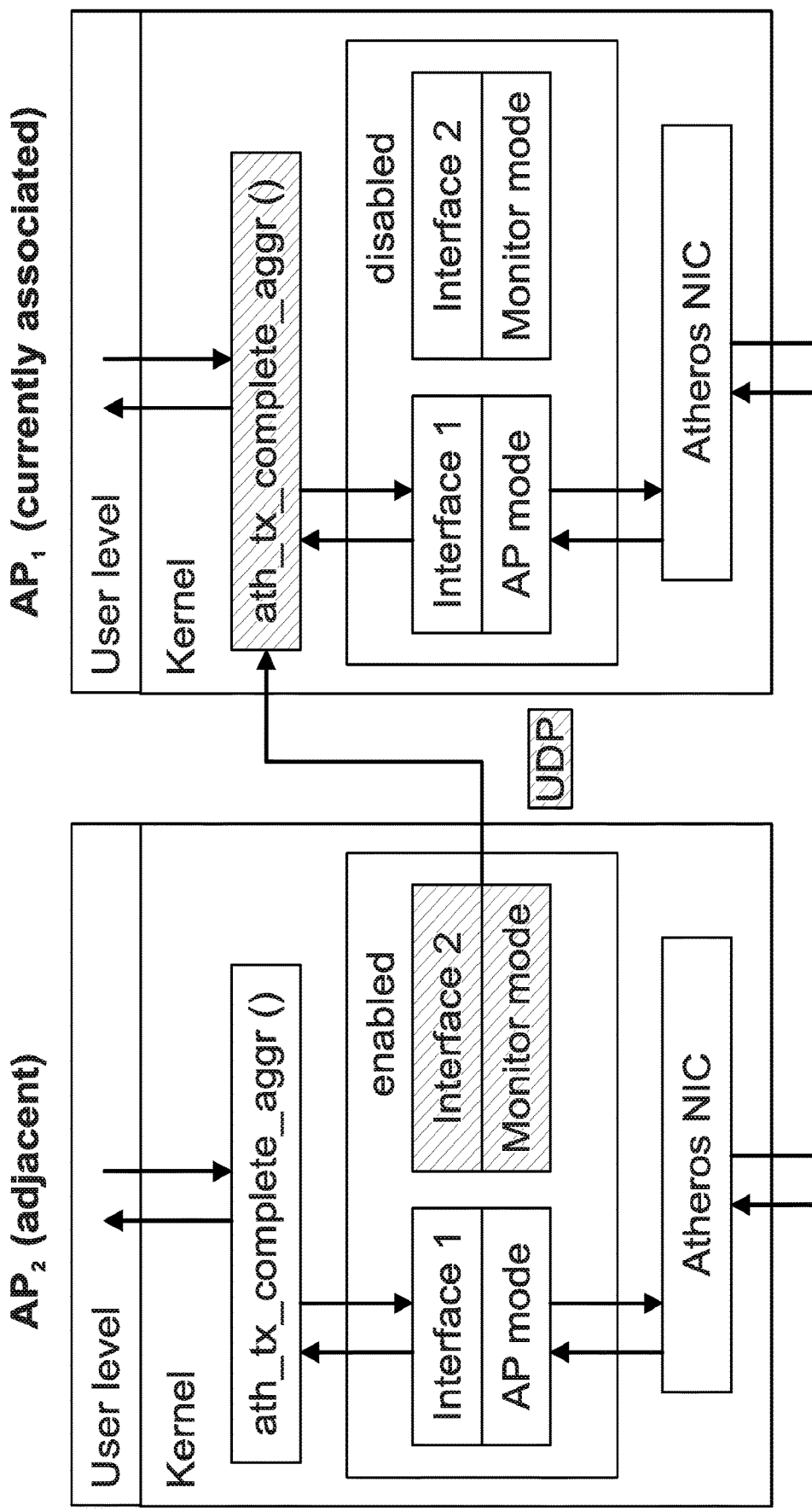
FIG. 8 is a block diagram illustrating block acknowledgement forwarding in a system for communication between wireless access points and a client device, according to an example embodiment.

FIG. 8 is a block diagram illustrating block acknowledgement forwarding in an example system for communication between wireless access points 210 and a client device 215. As shown in FIG. 8, upon receiving a block ACK, $AP_2$ can (i) extract the layer-2 source address (client's address), the sequence number of the first packet that should be acknowledged in this Block ACK, and the Block ACK bitmap, (ii) encapsulate them into a UDP packet, and (iii) forward the UDP packet to $AP_1$. Upon receiving the information, $AP_1$ can first check whether this Block ACK has been received before (from its own NIC or from other APs). If so, $AP_1$ can drops the forwarded block ACK. Otherwise, $AP_1$ can update the ath tx status data structure, or similar data structure, using the received information, and can input the data structure to the function ath tx complete aggr( ) where the newly updated block ACK bitmap is examined. The result is a decrease in effective block ACK loss rate.

Packet Addressing and Tunneling—Uplink packets sent from a client 215 are able to be received by one or more APs 210, which can encapsulate the packet in an UDP/IP and 802.3 header, putting the source layer-2 and layer-3 address as the received AP, and the destination host as the controller 205. Consequently, the controller 205 can record from which AP the received packet is sent. The controller 205 can then strip the tunneling header of the packet and de-duplicate packets by checking the source IP address and the IP sequence number of incoming packets. To speed up the de-duplication process, a hashset can be used, which can include a 48-bit key unique to a specific packet using the source IP address and the IP identification field of the packet. Not all packets have an IP header. For packets without an IP header, it is possible to consider only ARP packets, where de-duplication is not needed.

Packet De-Duplication 425—As APs in the network are successfully associated with the client, the APs forward uplink packets heard from the client to the controller, resulting in packet duplication, which can lead to spurious TCP retransmissions, harming throughput. Hence the controller can de-duplicate uplink packets before forwarding them to the Internet.

Example Implementation

The following is an example implementation of the disclosed systems and methods. The AP and controller logic were tested by being implemented on commodity routers and laptops using a Click modular router, which was deploy a testbed on a third floor of an office building overlooking a road with a speed limit of 25 mph. The testbed was composed of eight APs interconnected with each other through an Ethernet backhaul.

Controller 205 (Hardware)—The controller was implemented using a Lenovo Thinkpad T430 laptop, equipped with a Intel Core i5-3320M CPU, 8 GB DDR3 RAM, and a 160 GB Solid State Drive (SSD). Two USB Ethernet adaptors were installed, one for LAN packet processing and another for the WAN.

Controller 205 (Implementation)—The controller can run on Ubuntu Linux v14.04 LTS. Click elements were written for control logic and install rules blocking the Linux kernel from receiving any packets received from the NIC, so Click was the only application with access to the NIC.

Access Point 210 (Hardware)—The AP was implemented using a TP-Link N750 AP equipped with an Atheros AR9344 NIC, which measures the CSI of each incoming frame and forwards it to the controller for processing. The default omnidirectional antennas were detached from the router and the router was connected it to a 14 dBi, 21-degree beamwidth Laird directional antenna using a Mini-Circuits ZN3PD-622W-S+RF splitter-combiner.

Access Point 210 (Implementation)—The TP-Link router runs openwrt Chaos Calmer v15.05.1. Click elements were written for AP control logic and a click configuration ap.click on it to (i) manage the packet queue and (ii) encapsulate uplink packets and forward them to the controller. The Atheros NIC on the TPLink router computes the CSI of each uplink packet (using a CSI tool), encapsulating the CSI and client information into a UDP packet, and delivering this packet to the controller through the Ethernet.

Figure 9:
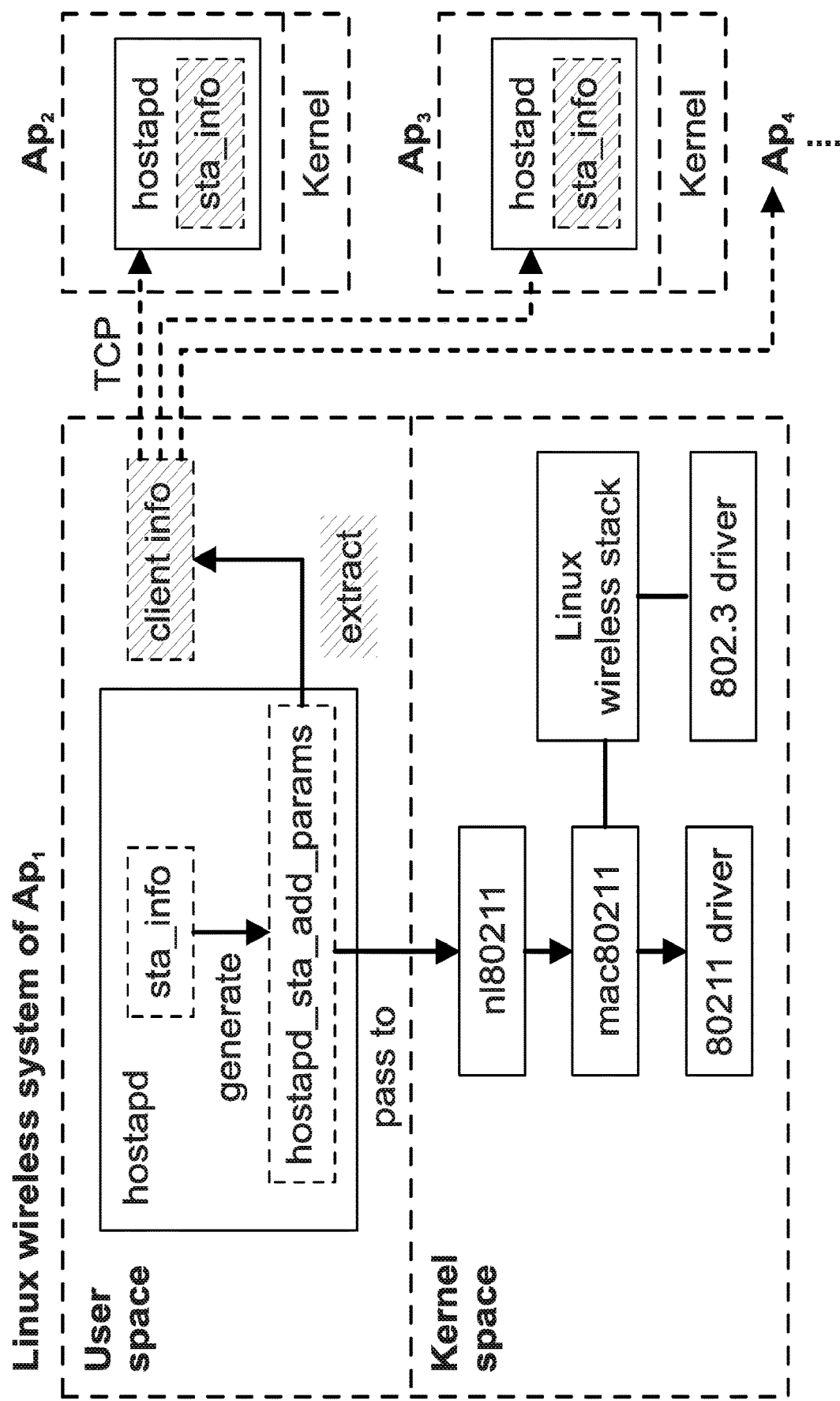
FIG. 9 is a block diagram illustrating association of a client device with wireless access points.

Client Association—Like other wireless local area network designs that utilize "thin APs" coupled with a centralized controller, the APs 210 of the disclosed systems and methods all can share the same 802.11 basic service set identifier (BSSID), and so appear as one AP to the client 215. When a client 215 associates with a first AP (e.g., AP1), the association can be synchronized with all APs 210 in the network. To achieve this goal, hostapd can be modified in the user space of the Linux wireless system, letting $AP_1$ send the client information (layer-2 address, authorization state etc.) to other APs through the Ethernet backhaul. For example, at the end of the client association with $AP_1$, the hostapd of the AP can receive an association callback, signaling that hostapd's association confirmation to the client 215 has been received. $AP_1$ then moves the client information sta info struct to a new hostapd sta add params struct, passing it to the kernel level mac80211 and the driver. Code may be added to extract the client information within hostapd sta add params struct of $AP_1$, open a TCP connection to all other APs in the network, and transmit the client information sta info to those APs. On the other end, the receiving AP is listening for this TCP connection. When the TCP connection is set up, the information in the received packet can be transferred back into a hostapd sta add params struct and passed into mac80211 and the driver on the received AP. FIG. 9 illustrates this process. Each AP can share client association state with the other APs over the Ethernet backhaul.

Evaluation

Field studies were conducted to evaluate the end-to-end performance of the example system and compare the performance with a performance-tuned version of the 802.11r fast roaming protocol. Micro-benchmark experiments are presented to provide further insight into which factors impact the system's performance. Three real-world case were also conducted to show the example system's capability of handling online video streaming, remote video conferencing, and web browsing at driving speed.

Methodology—Three Lenovo L512 laptops with Atheros AR9590 wireless card served as clients in the experiments. The client transited through eight deployed APs at different driving speeds, ranging from 5 mph to 25 mph. For each experiment, packet flows were logged and sent to and from both the controller and the client using tcpdump for data analysis.

Comparison Scheme—A performance-tuned version of the IEEE 802.11r fast roaming protocol was implemented and deployed on the testbed for comparison. In most 802.11r implementations, the client does not switch to another AP until it collects a number of RSSI readings from the AP it currently associated with, but as shown above, this fails in the vehicular picocell regime. Therefore, an enhanced combination of the standard 802.11r and 802.11k protocols was used along with a best understanding of centralized controller WLAN products in a straightforward way that the industry is expected to proceed: (1) Each AP beacons every 100 ms, from which the client discovers their presence and estimates RSSI. (2) An RSSI threshold is set below which a client switches to another AP with the highest RSSI value once the RSSI of the current AP is lower than this threshold, with a time hysteresis of one second. (3) After the first client association, other APs learn the authentication and association information of that client (as current products based on a centralized controller implement) and thus can forward to other APs any authentication or association frame from the client in the uplink direction. This may be referred to as Enhanced 802.11r, using it as a performance benchmark in the remainder of the evaluation.

End-to-End Performance

First evaluated was the end-to-end performance of the example system's delivering bulk TCP and UDP data flows.

Single-Client Experiments—Throughput was examined for different client device moving speeds, varying the driving speed from 5 mph to 25 mph, and testing TCP and UDP throughput of the example system and the Enhanced 802.11r fast roaming protocol. The example system achieves constantly high throughput at both low (5 mph) and high (25 mph) moving speeds, with average speed for 6.6 Mbits/s for TCP and 8.7 Mbits/s for UDP. In contrast, Enhanced 802.11r achieves only 2.7 Mbits/s and 3.3 Mbits/s throughput for TCP and UDP at 5 mph driving speed. As the client moves at 25 mph, the TCP and UDP throughput of Enhanced 802.11r further drops to 1.4 Mbits/s, and 2.2 Mbits/s, respectively.

To better understand the sources of the example system's throughput gain over Enhanced 802.11r, the TCP throughput was examined against time. The example system switches from one AP to another at high frequency (around five times per second), providing the client with the best link at each period of time. Benefiting from fast link switching, example system's throughput maintains at a relatively stable level (around 5 Mbits/s) throughout the client's transition over eight APs. In contrast, the TCP throughput of Enhanced 802.11r increases as the client moves to the associated AP, and then drops to zero at about 2.5 s in the experiment as the client moves out of the AP's radio range. This is because Enhanced 802.11r fails to switch promptly as the client moves near the edge of the current AP's coverage, where the current link deteriorates significantly, and so incurs a high packet loss rate. TCP timeout occurs at around 5.86 s, causing the TCP connection to break thereafter. UDP transmission, where the example system switches between multiple client-AP links frequently to enjoy the better link quality, thereby keeping a relatively stable transmission rate throughout the client's movement. Enhanced 802.11r switches only three times during the entire transition period (10 s), achieving a low and unstable throughput.

Link Bit Rate—Also examined was the link bit rate of the example system during the client's movement. In this experiment, the client transited through eight APs at a constant speed (15 mph) and sent TCP and UDP packets to the AP during its movement. It was found that the link bit rate distribution of the example system is similar to that of Enhanced 802.11r, with both achieving a 90% quartile of around 70 Mbits.

Accuracy of AP Switching—Switching accuracy of a handover algorithm may be defined as the fraction of the time that the algorithm chooses the optimal AP to deliver the packet, where the optimal AP is the AP with maximum ESNR to the client at any instant in time. In this experiment, both TCP and UDP packets were sent at the maximum rate to a vehicle moving at 15 mph that transits across eight APs, and the switching accuracy of the example system and Enhanced 802.11r were tested. Table 2 shows the results.

TABLE 2

Switching accuracy for TCP and UDP flows
from a single client moving at 15 mph.

|  | Example System (%) | Enhanced 802.11r (%) |
|---|---|---|
| TCP | 90.12 | 20.24 |
| UDP | 91.38 | 18.72 |

As shown, the example system achieves over 90% switching accuracy for both TCP and UDP transmissions. In contrast, Enhanced 802.11r's switching accuracy is only 20.24% for TCP transmission, it then drops further to 18.72% for UDP transmission. The reason behind this result is that the optimal link changes from one AP to another rapidly in the vehicular picocell regime due to fast fading wireless channels, while Enhanced 802.11r chooses to switch only when the current link deteriorates significantly. Combined with the previous result, this result demonstrates that contrary to many other wireless networking designs, better packet switching decisions, instead of physical-layer bit rate adaptation, are responsible for much of the example system's gains.

Multiple-client experiments—Also tested was the ability of the example system to improve the performance of multiple clients moving on the road simultaneously. The number of clients was varied from one to three, measuring per-client TCP and UDP throughput of the example system and the Enhanced 802.11r fast roaming protocol. The example system achieved an average per-client 5.3 Mbits/s TCP throughput and 8.2 Mbits/s UDP throughput in the single client case, which was 2.5 times and 2.1 times of the TCP and UDP throughput achieved by Enhanced 802.11r. As the number of clients on the road was increased, the throughput gap between example system and Enhanced 802.11r increased to 2.6 times and 2.4 times for TCP and UDP transmissions, respectively. The reason behind this is that multiple vehicles (clients) moving around will introduce dynamic multi-path, and so a higher packet loss rate. Accordingly, the throughput of Enhanced 802.11r drops significantly. In contrast, the example system benefits from the uplink diversity: each AP overhears the uplink packet and forwards it to the server, resulting in a reduced amount of retransmissions and so a higher throughput. For example, with a single up link, the packet loss rate changes abruptly for all three client devices. In contrast, with multiple up links, the packet loss rate maintains at a very low level (below 0.02) for the three client devices.

Further tested was the TCP throughput in three multiple-client scenarios: following driving, parallel driving, and driving in opposing directions. In each test, the server sent UDP packets at a constant rate (15 Mb/s) to the clients moving at 15 mph. The highest TCP and UDP throughput was achieved in the case of two cars driving in opposite directions. This is because most of the time the two clients are far away from each other during their transition periods. Hence there is minimum link contention, and so a higher throughput for each client. The lowest TCP (4.8 Mbits/s) throughput and UDP throughput (5.0 Mbits/s) was in the case with two vehicles driving in parallel and transiting though eight APs. This is because the two client devices stay near to each other, hence they can carrier sense each other, resulting in a higher link contention and a lower TCP and UDP throughput. Nevertheless, the example system achieves consistently better performance than the Enhanced 802.11r fast roaming protocol in all three multi-client testing cases; higher TCP and UDP throughput than Enhanced 802.11r. This is because the example system leverages the link diversity to let all APs forward overheard packets to the remote sever, thereby greatly reducing packet retransmissions.

Microbenchmarks

Microbenchmarks are aimed at understanding the impact of certain parameters on system performance.

Choosing a Proper Window Size—The example system uses a time window W to compare ESNR readings from different APs, so W is important to the accurateness and agility of AP selection. An emulation-based experiment was performed to inform the choice of W by driving at a constant speed (15 mph) and collecting 10 runs of ESNR data. Based on that, the window size was varied and the average channel capacity loss was computed for ten test cases. The capacity loss decreases as the window size is enlarged to 10 ms, and then increases as the window size is expand further. Based on the experiment result, W was set to 10 ms, which achieved minimal channel capacity loss.

Link layer ACK Collision Rate—As all APs in the network can be simultaneously associated with the client, they all reply with link layer (block) acknowledgements after hearing an uplink packet, resulting in potential collisions at the client, and so uplink packet retransmissions. To understand how frequently link layer acknowledgement collisions happen in the example system, RTS/CTS was turned off and a constant-rate stream of UDP packets was sent using iperf3 and measured the number of uplink retransmissions to upper-bound the frequency of link layer acknowledgment collisions, as uplink retransmissions could have other causes, such as data packet loss on the uplink. The results are shown in Table 3.

TABLE 3

Link layer ACK collision rate at the client side

| Data rate (Mbits/s) | 70 | 80 | 90 |
|---|---|---|---|
| Ack collision rate (%) | 0.001 | 0.003 | 0.004 |

Link layer acknowledgement collisions rarely happen in the example system, with only 0.001% for 70 Mbits/s UDP sending rate, and 0.004% for 90 Mbits/s UDP sending rate. The reason for this may be that TP-Link AP issues an HT immediate block ACK with some backoff. It was found that the interval between the last MPDU and block ACK varies in the range of microseconds instead of being a fixed time. If backoff is performed, side lobes of the parabolic antenna prevent link layer acknowledgement collisions from happening. Given the experiment results, it can be concluded that such a small fraction of collision has minimal impact on the example system's throughput.

Impact of Time Hysteresis for AP Switching—Also examined was the impact of time hysteresis for AP switching on the throughput. In this experiment, time hysteresis was varied from 120 ms down to 40 ms, and a client transited across eight APs to receive TCP packets sent from the server. The throughput changes in a similar trend for the three different time hysteresis settings, fluctuating due to channel variations but never dropping to zero due to prompt AP switches. As the time hysteresis is decreased, the throughput grows gradually from 1.3 Mbits/s to around 6.4 Mbits/s at 2 s. The throughput gain is due to the fact that the channel condition changes frequently at driving speed. A smaller time hysteresis renders the switching algorithm of the example system more able to adapt to the fast channel changes and achieve a higher throughput.

Impact of AP Density—Also examined was the impact of AP density on the throughput. In this experiment, the driving speed of the client was varied and the UDP throughput measured in both a dense and sparse AP deployment area of the testbed. As expected, the example system achieves a consistently high UDP throughput in both sparse and dense AP deployments under different driving speeds. The UDP throughput increases from 6.7 Mbits/s on average to around 9.3 Mbits/s as the client moves from the area of low AP density to the area of high AP density. This is due to the fact that the example system benefits from uplink diversity of nearby APs and receives packets through multiple paths, and so enjoys a lower packet loss rate and a higher throughput.

Case Studies

Three real-world case studies were conducted to examine the example system's performance in streaming applications: online video streaming, remote video conferencing, and web browsing.

Online video—In this case study, the example system's ability to reliably stream video to mobile clients was tested. A video rebuffer ratio was used as the metric to measure the video's quality of experience (QoE). Video rebuffer measures number of times and the duration of interruptions due to re-buffering. The video rebuffer ratio is defined as the fraction of rebuffers over the time duration that the client transits through eight APs. To minimize the impact of Internet latency on video rebuffers, the video was cached in the local server. In this experiment, a volunteer was asked to watch a HD video (1280×720 resolution) through the testbed. The moving speed of the client device was varied and the rebuffer ratio of the video was tested using the VLC media player and played online streaming via FTP. The pre-buffer length was set to be 1,500 ms. The results are shown in Table 4.

TABLE 4

| Video rebuffering ratio at different moving speeds | | | | |
|---|---|---|---|---|
| Client speed (mph) | 5 | 10 | 15 | 20 |
| Example System | 0 | 0 | 0 | 0 |
| Enhanced 802.11r | 0.69 | 0.64 | 0.61 | 0.54 |

As shown, the example system achieved a smooth video playback with zero rebuffer ratio in both low (5 mph) and high (20 mph) driving speed. In contrast, the video rebuffer ratio reaches to 0.69 at 5 mph driving speed and drops gradually to 0.54 at 20 mph driving speed when the client transits through APs through the Enhanced 802.11r fast roaming protocol. The decreasing trend of the rebuffer ratio here is due to the significant decreasing of the transition time at higher moving speed.

Remote Video Conferencing—In this case study, the example system's ability to provide reliable video streaming to mobile clients was tested. Unlike the previous case study, remote video conferencing requires the mobile client to simultaneously upload and download real-time video streams, hence have an even higher link quality requirement. In this experiment, a two-user video conference was performed, with one user on a moving vehicle and the other in a conference room. Both applications periodically present their fps on an application user interface. Screenshots software was used to record the fps every 1 s. The frames per second (fps) of the downlink video were measured on each client side. 85% of 20 fps was achieved using Skype on both 5 mph and 15 mph driving speeds. The fps increases to 56 when using Google Hangouts. This is likely because Google Hangouts automatically reduces image resolution of each frame.

Web Browsing—In this case study, the example system's ability to load web pages quickly for a mobile client was tested. A volunteer browsed an eBay homepage (2.1 MB) during a fast transition among eight APs. The client moving speed was varied, and the duration of time that the system launched the web browser until the webpage was fully loaded in the web browser was measured. To minimize the impact of Internet latency on measurement results, the webpage was stored on the local server, allowing the client to load the webpage directly. At each driving speed, the experiment was repeated ten times and the results averaged. The results are shown in Table 5.

TABLE 5

| Web page loading time at different driving speeds | | | | |
|---|---|---|---|---|
| Client speed (mph) | 5 | 10 | 15 | 20 |
| Example System | 4.44 | 4.64 | 4.34 | 4.47 |
| Enhanced 802.11r | 15.49 | 18.21 | ∞ | ∞ |

As shown, the example system achieved constantly stable webpage loading times at different driving speeds. In contrast, the webpage loading time increased to around 18 s at 10 mph as when using Enhanced 802.11r as the roaming protocol. As the driving speed was increased further, the client never successfully loaded the whole webpage during its short driving time across eight APs.

Digital Processing Environment

Figure 10:
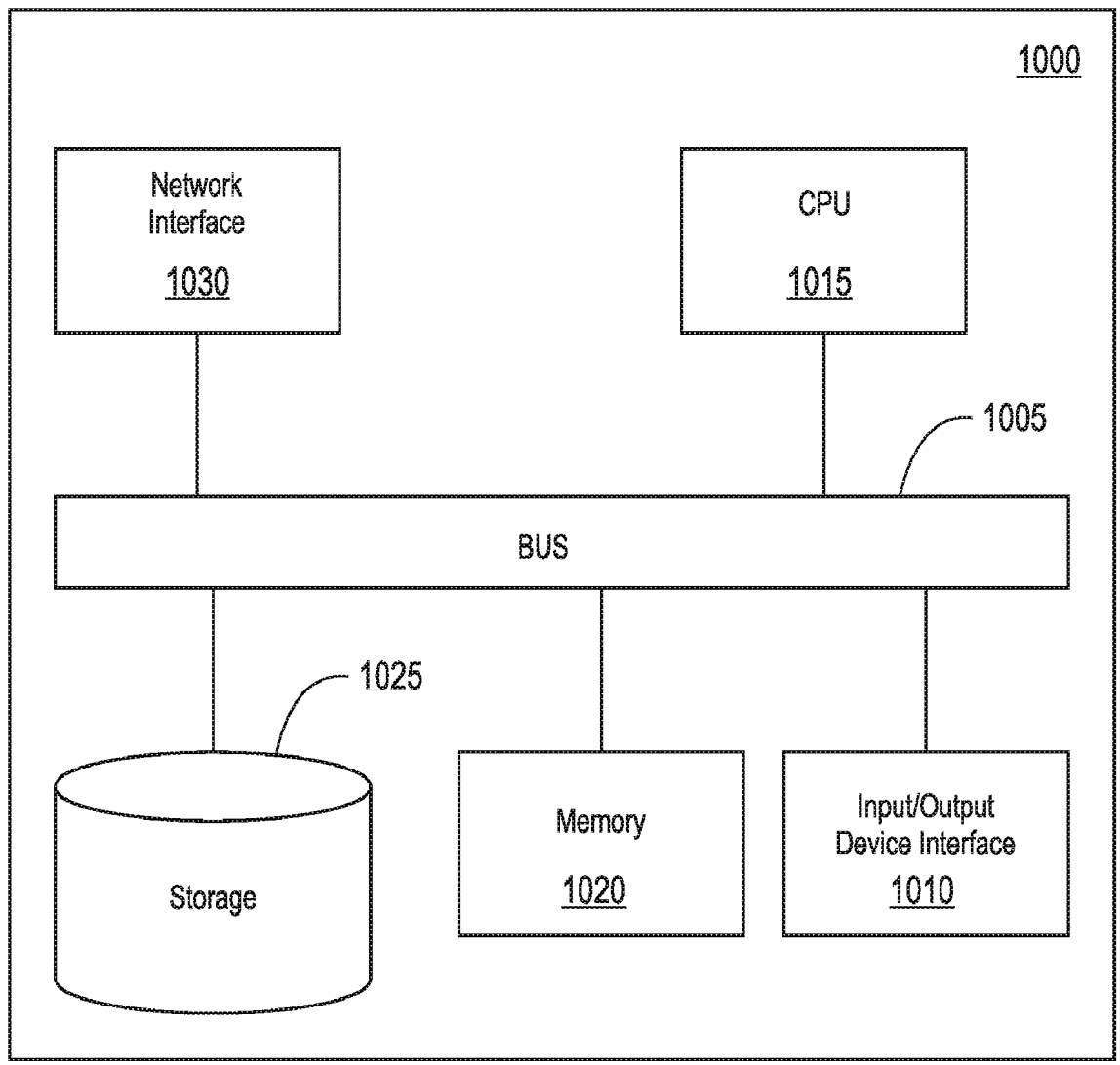
FIG. 10 is a simplified block diagram of a computer-based system 1000 that may be used to implement components of the example embodiments.

FIG. 10 is a simplified block diagram of a computer-based system 1000 that may be used to implement components of the example embodiments disclosed herein. The system 1000 comprises a bus 1005. The bus 1005 serves as an interconnector between the various components of the system 1000. Connected to the bus 1005 is an input/output device interface 1010 for connecting various input and output devices such as a keyboard, mouse, display, touch screen overlay, speakers, camera, sensor feeds, controllers, etc. to the system 1000. A central processing unit (CPU) 1015 is connected to the bus 1005 and provides for the execution of computer instructions. Memory 1020 provides volatile storage for data used for carrying out computer instructions. Storage 1025 provides non-volatile storage for software instructions, such as an operating system (not shown). In particular, memory 1020 and/or storage 1025 can be configured with program instructions implementing methods and/or modules 300, 405, 415, 420, 425, and 700, as detailed above and in association with FIGS. 3, 4, and 7, for example. The system 1000 can also comprises a network interface 1030 for connecting to any variety of networks known in the art, including cloud, wide area networks (WANs), and local area networks (LANs), via a variety of types of network links, including wired, fiber optic, or wireless links.

It should be understood that the example embodiments described herein may be implemented in many different ways. In some instances, the various methods, systems, and devices described herein may each be implemented by a physical, virtual, or hybrid general purpose computer. The computer system 1000 may be transformed into the machines that execute the methods described herein, for example, by loading software instructions into either memory 1020 or non-volatile storage 1025 for execution by the CPU 1015.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A system for controlling communication of wireless access points with a client device, the system comprising:
   a plurality of wireless access points configured to communicate with the client device and to determine communication channel properties of the wireless communication channels between each of the wireless access points and the client device based on communication with the client device over the wireless channels, each wireless access point including a queue of data to send to the client device; and
   a controller in communication with the wireless access points, the controller configured to:
   select, from among the plurality of wireless access points based on the communication channel properties, a wireless access point to send data to the client device, thereby also defining a subset of the plurality of wireless access points, the subset including wireless access points not selected by the controller to send data to the client device;
   cause, when switching from a first wireless access point to a second wireless access point, the second wireless access point to be provided with information regarding a position in the queue of the second wireless access point at which to start sending data to the client device;
   provide, to wireless access points in a vicinity of the client device, a downlink packet destined for the client device; and
   remove, from respective queues of the wireless access points not selected to send data to the client device, data that has been sent to the client device by the wireless access point selected to send data to the client device.

2. A system as in claim 1 wherein the communication channel properties include Channel State Information.

3. A system as in claim 1 wherein each wireless access point is configured to measure communication channel properties for communications between the wireless access point and the client device and transmit the communication channel properties to the controller.

4. A system as in claim 3 wherein communication between the wireless access points and the client device are sent via Transmission Control Protocol, and wherein the communication channel properties are sent from the wireless access points to the controller via User Datagram Protocol.

5. A system as in claim 3 wherein the controller is configured to receive the communication channel properties by the wireless access points and determine signal-to-noise ratios for corresponding wireless communication channels based on the communication channel properties, and wherein the controller is configured to select a wireless access point with the greatest signal-to-noise ratio.

6. A system as in claim 1 wherein the controller is configured to remove, from a 802.11 link-layer queue and associated block acknowledgement scoreboard data structure of each wireless access point not selected to send data to the client device, data that has been sent to the client device by the wireless access point selected to send data to the client device, and the associated block acknowledgement scoreboard state.

7. A method of controlling communication of a plurality of wireless access points with a client device, each wireless access point including a respective queue of data to send to the client device, the method comprising:
   determining, by the plurality of wireless access points, communication channel properties of wireless communication channels between the wireless access points and the client device based on communication with the client device over the wireless channels;
   forwarding, by the plurality of wireless access points, the communication channel properties to a controller;
   selecting, by the controller based on the communication channel properties, a wireless access point from among the plurality of wireless access points to send data to the client device, thereby also defining a subset of the plurality of wireless access points, the subset including wireless access points not selected by the controller to send data to the client device;
   causing, by the controller when switching from a first wireless access point to a second wireless access point, the second wireless access point to be provided with information regarding a position in the respective queue of the second wireless access point at which to start sending data to the client device;
   providing, by the controller, to wireless access points in a vicinity of the client device, a downlink packet destined for the client device; and
   removing, by the controller, from the respective queue of each wireless access point not selected to send data to the client device, data that has been sent to the client device by the wireless access point selected to send data to the client device.

8. A method as in claim 7 wherein the communication channel properties include Channel State Information.

9. A method as in claim 7 wherein each wireless access point measures communication channel properties for communications between the wireless access point and the client device and transmits the communication channel properties to the controller.

10. A method as in claim 9 wherein communication between the wireless access points and the client device are sent via Transmission Control Protocol, and wherein the communication channel properties are sent from the wireless access points to the controller via User Datagram Protocol.

11. A method as in claim 9 wherein the controller receives the communication channel properties transmitted by the wireless access points and determines signal-to-noise ratios for corresponding wireless communication channels based on the communication channel properties, and wherein the controller selects a wireless access point with the greatest signal-to-noise ratio.

12. A method as in claim 7 wherein the controller removes, from a 802.11 link-layer queue and associated block acknowledgement scoreboard data structure of each wireless access point not selected to send data to the client device, data that has been sent to the client device by the wireless access point selected to send data to the client device, and the associated block acknowledgement scoreboard state.

13. A system for communication between wireless access points and a client device, the system comprising:
   a plurality of wireless access points configured to communicate with the client device and to receive acknowledgement data from the client device in response to data sent to the client device; and
   a controller in communication with the wireless access points and configured to select, from among the plurality of wireless access points, a wireless access point to send data to the client device;
   in an event (i) the controller causes a first wireless access point to stop sending data to the client device and a second wireless access point to send data to the client device, (ii) the first wireless access point does not receive acknowledgement data from the client device for certain data sent to the client device by the first wireless access point, and (iii) the second wireless access point receives the acknowledgement data from the client device for the certain data, the second wireless access point or the controller provides the acknowledgement data to the first wireless access point.

14. A system as in claim 13 wherein the acknowledgement data includes Transmission Control Protocol acknowledgement data.

15. A system as in claim 13 wherein the acknowledgement data includes IEEE 802.11 link-layer block acknowledgement data.

16. A system as in claim 13 wherein wireless access points not selected to send data to the client device are configured to monitor for acknowledgement data sent from the client device to the wireless access point selected to send data to the client device.

17. A system as in claim 16 wherein the monitoring wireless access points are configured to send received acknowledgement data to the wireless access point selected to send data to the client device.

18. A system as in claim 17 wherein the wireless access point selected to send data to the client device is configured to update an acknowledgement data structure with the acknowledgement data received from a monitoring wireless access point if the acknowledgement data was not already received.

19. A method of communicating between a plurality of wireless access points and a client device, the method comprising:
   selecting, by a controller, a second wireless access point from among the plurality of wireless access points to send data to the client device;
   causing, by the controller, a first wireless access point to stop sending data to the client device;
   causing, by the controller, the second wireless access point to send data to the client device; and
   in an event (i) the first wireless access point does not receive
   acknowledgement data from the client device for certain data sent to the client device by the first wireless access point, and (ii) the second wireless access point receives the acknowledgement data from the client device for the certain data, providing, by the second wireless access point or the controller, the acknowledgement data to the first wireless access point.

20. A method as in claim 19 wherein the acknowledgement data includes Transmission Control Protocol acknowledgement data.

21. A method as in claim 19 wherein the acknowledgement data includes IEEE 802.11 link-layer block acknowledgement data.

22. A method as in claim 19 wherein wireless access points monitor for
   acknowledgement data sent from the client device to the wireless access point selected to send data to the client device.

23. A method as in claim 22 wherein the monitoring wireless access points send received acknowledgement data to the wireless access point selected to send data to the client device.

24. A method as in claim 23 wherein the wireless access point selected to send data to the client device updates an acknowledgement data structure with the acknowledgement data received from a monitoring wireless access point if the acknowledgement data was not already received.

* * * * *